United States Patent
Abenaim

(10) Patent No.: US 11,877,908 B2
(45) Date of Patent: Jan. 23, 2024

(54) DENTAL ABUTMENT SCREW

(71) Applicant: Jonathan Abenaim, Hawthorne, NJ (US)

(72) Inventor: Jonathan Abenaim, Hawthorne, NJ (US)

( * ) Notice: Subject to any disclaimer, the term of this patent is extended or adjusted under 35 U.S.C. 154(b) by 375 days.

(21) Appl. No.: 17/079,786

(22) Filed: Oct. 26, 2020

(65) Prior Publication Data

US 2022/0125558 A1    Apr. 28, 2022

(51) Int. Cl.
*A61C 8/00* (2006.01)

(52) U.S. Cl.
CPC ............ *A61C 8/0025* (2013.01); *A61C 8/005* (2013.01); *A61C 8/0012* (2013.01); *A61C 8/0028* (2013.01)

(58) Field of Classification Search
CPC ... A61C 8/0025; A61C 8/0012; A61C 8/0028; A61C 8/005; A61C 8/0022; A61C 8/0018; A61C 8/00; A61C 8/0048
USPC ........................................ 433/174–176, 201.1
See application file for complete search history.

(56) References Cited

U.S. PATENT DOCUMENTS

| | | | |
|---|---|---|---|
| 4,850,870 A | | 7/1989 | Lazzara et al. |
| 4,988,298 A | * | 1/1991 | Lazzara ................. A61C 8/005 433/173 |
| 5,344,318 A | * | 9/1994 | Wilson ................. A61C 8/0048 433/177 |
| 5,620,323 A | * | 4/1997 | Bressman ............ A61C 8/0048 433/211 |
| 5,704,788 A | | 1/1998 | Milne |
| 2011/0306014 A1 | * | 12/2011 | Conte .................. A61C 8/0001 433/214 |
| 2015/0147721 A1 | | 5/2015 | Costa Codina |
| 2016/0250002 A1 | | 9/2016 | Cota |
| 2018/0078345 A1 | * | 3/2018 | Elsner .................... A61C 8/005 |

FOREIGN PATENT DOCUMENTS

EP          1547543         6/2005
WO    WO-2020043347 A1 *   3/2020    ......... A61C 13/0019

OTHER PUBLICATIONS www.Dess-usa.com DESS products 5 pages.
Search Report and Written Opinion dated Jan. 28, 2022 issued in International Patent Application No. PCT/US21/56466.

* cited by examiner

*Primary Examiner* — Ralph A Lewis
*Assistant Examiner* — Mirayda A Aponte
(74) *Attorney, Agent, or Firm* — Cozen O'Connor

(57) ABSTRACT

An abutment screw having a first hardness for use in affixing a dental prosthetic, having a second hardness less than the first hardness, to an abutment that itself is attachable to an implant in the mouth of a patient includes a head and a body. The body includes a smooth shank immediately proximate the head, and a threaded portion with a helical ridge that runs around its body, the helical ridge beginning at a point along the body distal the head portion. The head includes an upper surface, having a drive at a central portion thereof, and an underside surface having a convex radiused curvature extending until it meets the shaft, the convex radiused curvature being configured to conform to a corresponding concave curvature of a receiving portion of the prosthesis.

11 Claims, 8 Drawing Sheets

DENTAL ABUTMENT SCREW

BACKGROUND OF THE INVENTION

1. Field of the Invention

The present invention relates to abutment screws for use in dental implants.

2. Related Art

In recent years, dental implants have become a popular alternative to dental prostheses, such as dentures, bridges, or even capped root canals (e.g., in instances when the root canal fails and needs to be removed). A dental implant is an artificial tooth root. After installation of the implant, typically in the jawbone of a patient, the jawbone fuses with the implant to provide a secure platform to which a prosthesis, namely, an artificial tooth, can be secured.

Abutments are connecting pieces that join the prosthesis to the implants. An implant of a single tooth, for example, might initially need a "healing" abutment, and then, depending on the type of prosthesis, may require a permanent abutment which aids in affixing the prosthesis to the implant. When restoring a full arch of teeth, multiple implants are provided, using a screw-retained implant prosthetic.

Multi-unit abutments (MUA) are typically used in full arch screw-retained implant restoration. Such abutments may be of a substantially straight configuration, but also may be designed with a range of angle correction, and are available for virtually all implant platforms. Multi-unit abutments may therefore provide a positive uniform seat for all abutment sites, regardless of the angles of the implants to be engaged.

In recent years, a number of options have been developed for use as "hybrid" prosthesis, or hybrid denture, a term which is used for a prosthesis that combines aspects of denture technology and screw-retained implant restorations, thus the term "hybrid denture," which is also called a fixed/removable prosthesis.

The goal of such hybrid denture is to provide an option that is not removable by the patient, as in traditional dentures, but which can be removed by a technician to clean and tighten, and/or periodically tighten or replace screws. Hybrid dentures have several material choices available. Currently, ceramics, such as zirconia (zirconium dioxide $ZrO_2$), have become a preferred metal-free option.

An exploded view of a known arch restoration 102 using a hybrid denture prosthesis 106, multi-unit abutments 104, dental implants 100, and abutment screws 101, is shown in FIG. 1. As can be seen in the figure, abutment screws 101 are screws that pass through the prosthesis 106 to tighten and affix the prosthesis to the abutment 104, and ultimately to the implant 100.

A prior art abutment screw 400 is shown in FIG. 2A. Such a screw is typically made of metal, and in particular, Titanium (Ti), which has high hardness and strength, a low incidence of patient reaction, but which is also lightweight. As can be seen in FIG. 2A, the conventional abutment screw 400 is comprised generally of a head 402 and a body (or shaft) 403. A drive 404 is cut out so as to take up a major areal portion of the top of the head 402. The bottom portion 406 of the head 402 is a flat surface substantially perpendicular the length direction (long axis) of the screw 400.

The body 403 consists of a smooth shank 408 and threads 410. A prior art screw 400 abuts the prosthesis at an indent and hole, made in the chewing side of the prosthesis, which indent and hole are made for the purpose of receiving such screws, allowing the screw threads to pass through to the abutment.

However, a problem may occur using the prior art screw 400 if the prosthesis is made of a material of a lower degree of hardness than the Ti screw, such as a ceramic, for example zirconia. In particular, as illustrated in FIG. 2B, if a conventional Ti screw 400 is used to attach a portion of hybrid denture, or other prosthetic, 106 made of ceramic, such as zirconia, to an abutment 104, the abutting surface 406 of the base of the head 402 of the screw 400 provides points of force against the softer material of the prosthesis indentation 106a. Such contact force can result in stresses to the softer material, such as a cracking or weakening of the material at the outer circumferential edges of the surface of the lower portion 406. This can be seen in FIG. 2B.

While this effect could be ameliorated to some extent, for example in the case of zirconia, by hardening the zirconia, for example by sintering, this process is time consuming and complicates the manufacturing process for the hybrid denture. The above-described problem also exists when the prior art screw is used in an individual tooth prosthesis or a bridge prosthesis.

There is therefore a need for an abutment screw that can alleviate the problems of the prior art.

SUMMARY OF THE INVENTION

It is therefore an object of the invention to provide an abutment screw that prevents cracking or weakening of the receiving surfaces of a dental prosthesis that is formed of a material that is less hard than the metal of the screw.

The contact area between the underside of the screw head and the prosthesis presents a weak/break point on the softer material of the prosthesis, which may be, for example, zirconia. In one aspect, a rounding or curving the underside of the head on the screw is provided, which changes the dissipation of forces between the screw head and the receiving surface of the prosthesis, making this surface of the prosthesis less susceptible to breakage.

In accordance with one aspect of the invention, this object may be achieved by providing an abutment screw having a first hardness for use in affixing a dental prosthetic, having a second hardness less than the first hardness, to an abutment that itself is attachable to an implant in the mouth of a patient, the screw comprising a head and a body/shaft. The shaft of the screw comprising a smooth shank portion (i.e., shank) immediately proximate the head, and a threaded portion (i.e., the helical ridge that runs around its body), beginning at a point along the shaft distal the head portion. The head comprises an upper surface, having a drive indent at a central portion thereof, and a underside surface having a convex radiused curvature until it meets the shaft.

In accordance with a second aspect of the invention, an abutment screw having a first hardness for use in affixing a dental prosthetic, having a second hardness less than the first hardness, to an abutment that itself is attachable to an implant in the mouth of a patient includes: a head; and a body. The body includes: a smooth shank immediately proximate the head, and a threaded portion comprising a helical ridge that runs around its body, the helical ridge beginning at a point along the body distal the head portion. The head includes: an upper surface, having a drive at a central portion thereof, and an underside surface having a convex radiused curvature extending until it meets the shaft, the convex radiused curvature being configured to conform to a corresponding concave curvature of a receiving portion of the prosthesis.

In another aspect, the head further includes, at a peripheral region thereof, a vertical cylindrical wall.

In another aspect, the underside curved profile of the head of the screw has a radius of curvature in the range of 0.79-0.85 mm.

In another aspect, the height thickness of the head is at least 1.5 mm.

In another aspect, the helical ridge of the threaded portion comprises a minimum of 4 turns and no more than 6 turns.

In another aspect, the dental prosthetic having the second hardness is made of zirconia and the abutment screw having the first hardness is made of Titanium.

In another aspect, the length of the shank is approximately 2 mm.

In another aspect, the drive in less than 50% of the area of the top surface of the head.

In accordance to a third aspect of the present invention, a tooth replacement assembly for affixing a dental prosthesis to a dental implant affixed to a jaw bone of a patient includes: (a) an abutment having a first end configured to securely engage with the dental implant and having a second end with a female threading surrounded by a tapered upper profile wall; (b) the dental prosthesis having, at a first end facing the abutment, an outwardly tapering opening shaped and dimensioned so as to be snugly engageable with the tapered upper profile wall of the abutment, and, at a second end, a receiving surface; and (c) an abutment screw. The abutment screw includes: a head; and a body. The body includes: a smooth shank immediately proximate the head, and a threaded portion comprising a helical ridge that runs around its body, the helical ridge beginning at a point along the body distal the head portion. The head includes: an upper surface, having a drive at a central portion thereof, and an underside surface having a convex radiused curvature extending until it meets the shaft, the convex radiused curvature being configured to conform to a corresponding concave curvature of the receiving portion of the prosthesis. The screw is configured to be tightened, by application of twisting force to the drive, so that the threaded portion of the body of the screw threadingly engages the female threading of the abutment, thus causing the curvature of the screw head to securely mate with the corresponding curvature of the receiving portion of the prosthesis.

BRIEF DESCRIPTION OF THE FIGURES

The above and/or other aspects and advantages will become more apparent and more readily appreciated from the following detailed description of the disclosed embodiments taken in conjunction with the accompanying drawings in which.

DETAILED DESCRIPTION OF THE PRESENTLY PREFERRED EMBODIMENTS

FIGS. 3A to 3F show various views of two embodiments of an abutment screw in accordance with the present invention. The first embodiment has fully rounded sides of the head, and the second embodiment is identical to the first except that the side of the head has a cylindrically shaped cutaway portion.

Figure 3A:
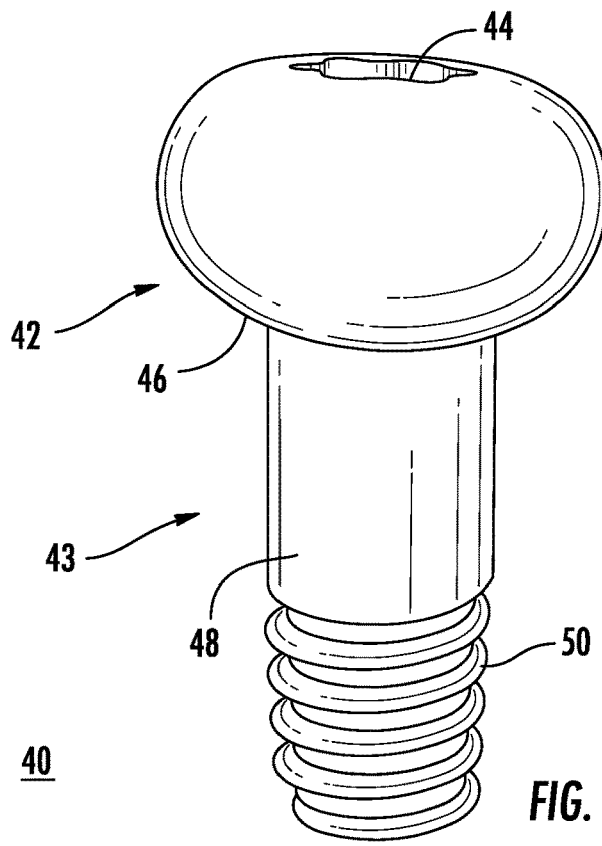
FIG. 3A is an elevational view of an abutment screw according to a first embodiment of the present invention.
Figure 3B:
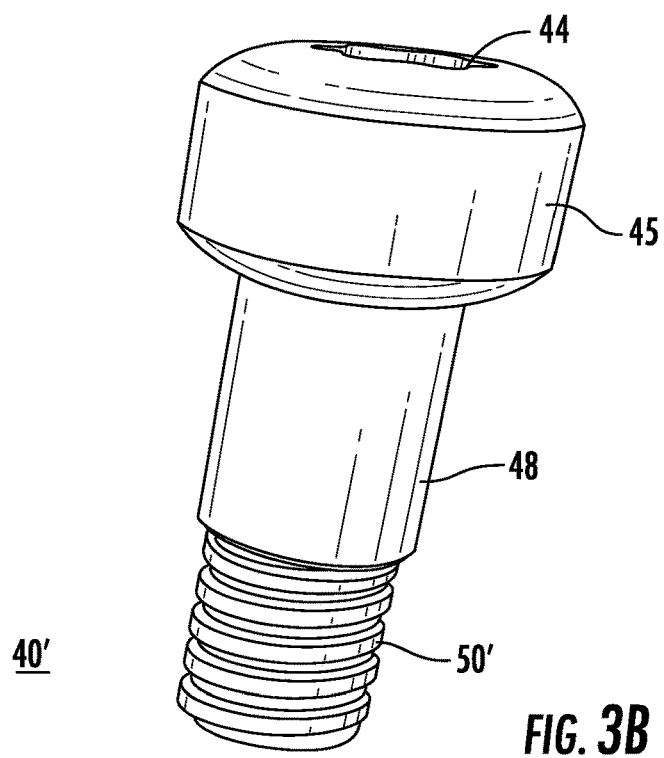
FIG. 3B is an elevational view of an abutment screw according to a second embodiment.
Figure 3C:
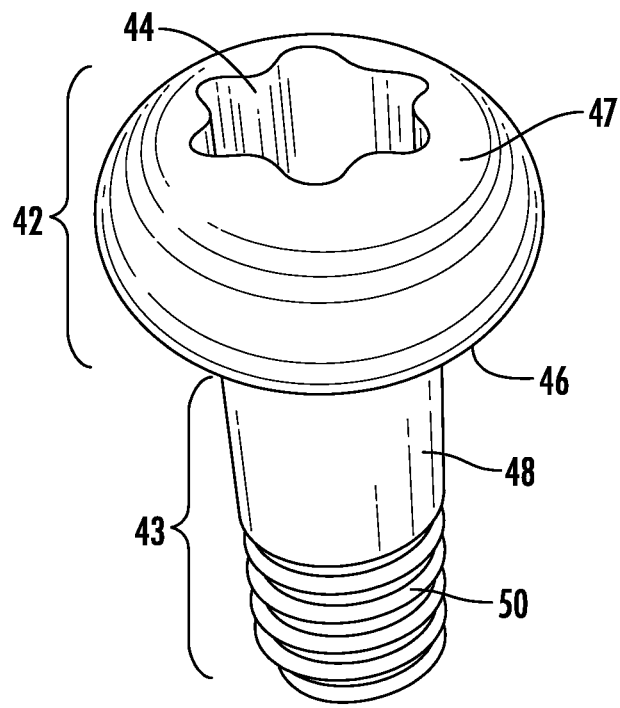
FIG. 3C is a top perspective view of the abutment screw of FIG. 3A.
Figure 3D:
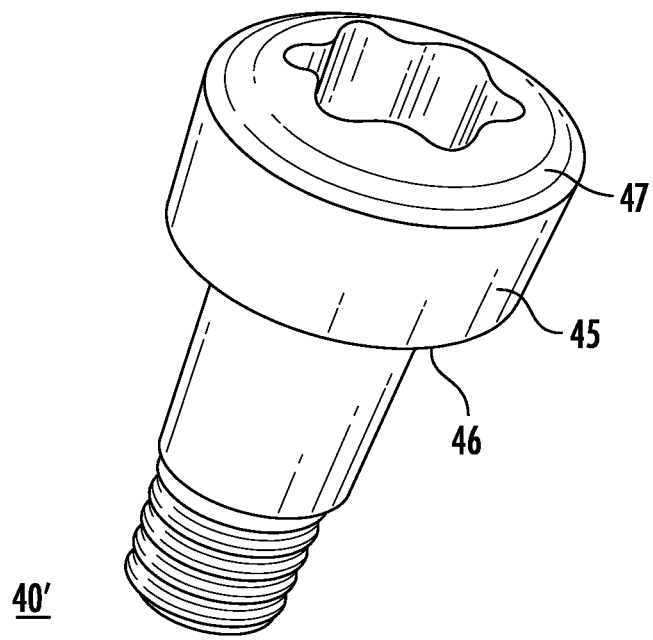
FIG. 3D is a top perspective view of the abutment screw of FIG. 3B.
Figure 3E:
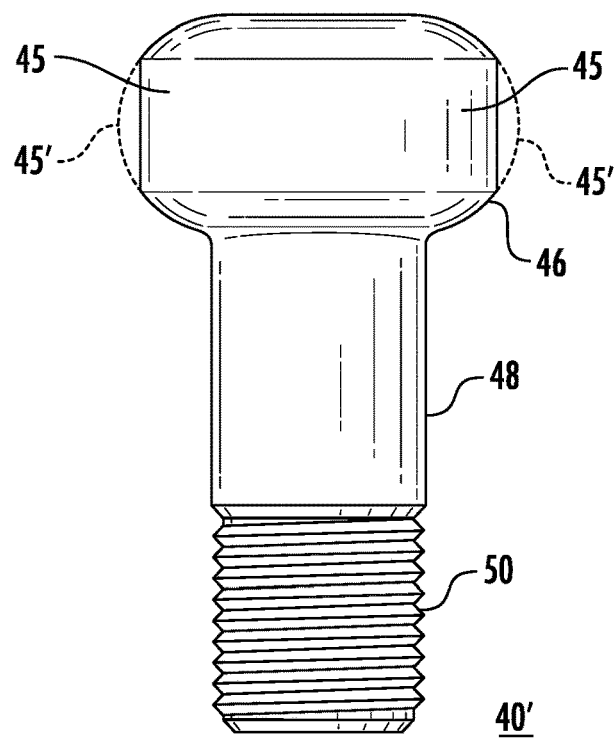
FIG. 3E is a side view of the abutment screw of FIG. 3B.
Figure 3F:
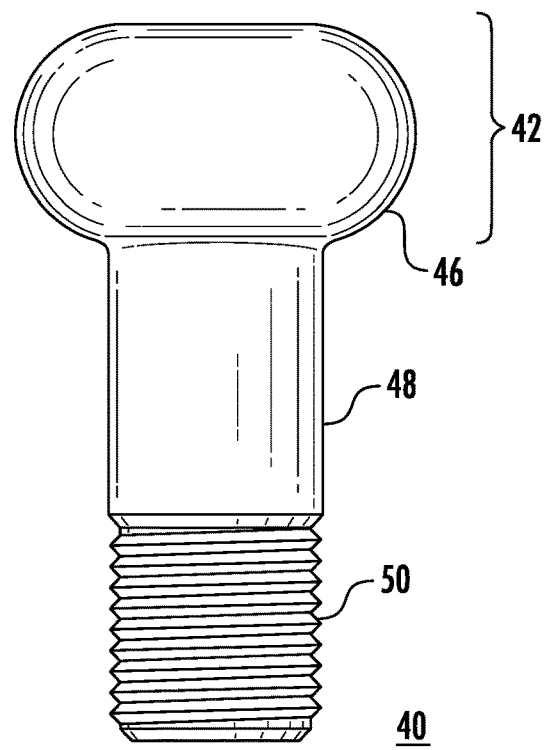
FIG. 3F is a side view of the abutment screw of FIG. 3A.

FIGS. 3A, 3C and 3F show the screw 40 in accordance with the first embodiment. As can be seen in these figures, in this embodiment rather that the fully cylindrically shaped head of the conventional screw 400 discussed above, with its flat bottom 406, the abutment screw 40 according to this embodiment of the present invention has a head 42 shaped generally as an oblate spheroid, with a curved top and bottom surface, and having a generally curved peripheral edge of the head as well.

Figure 1:
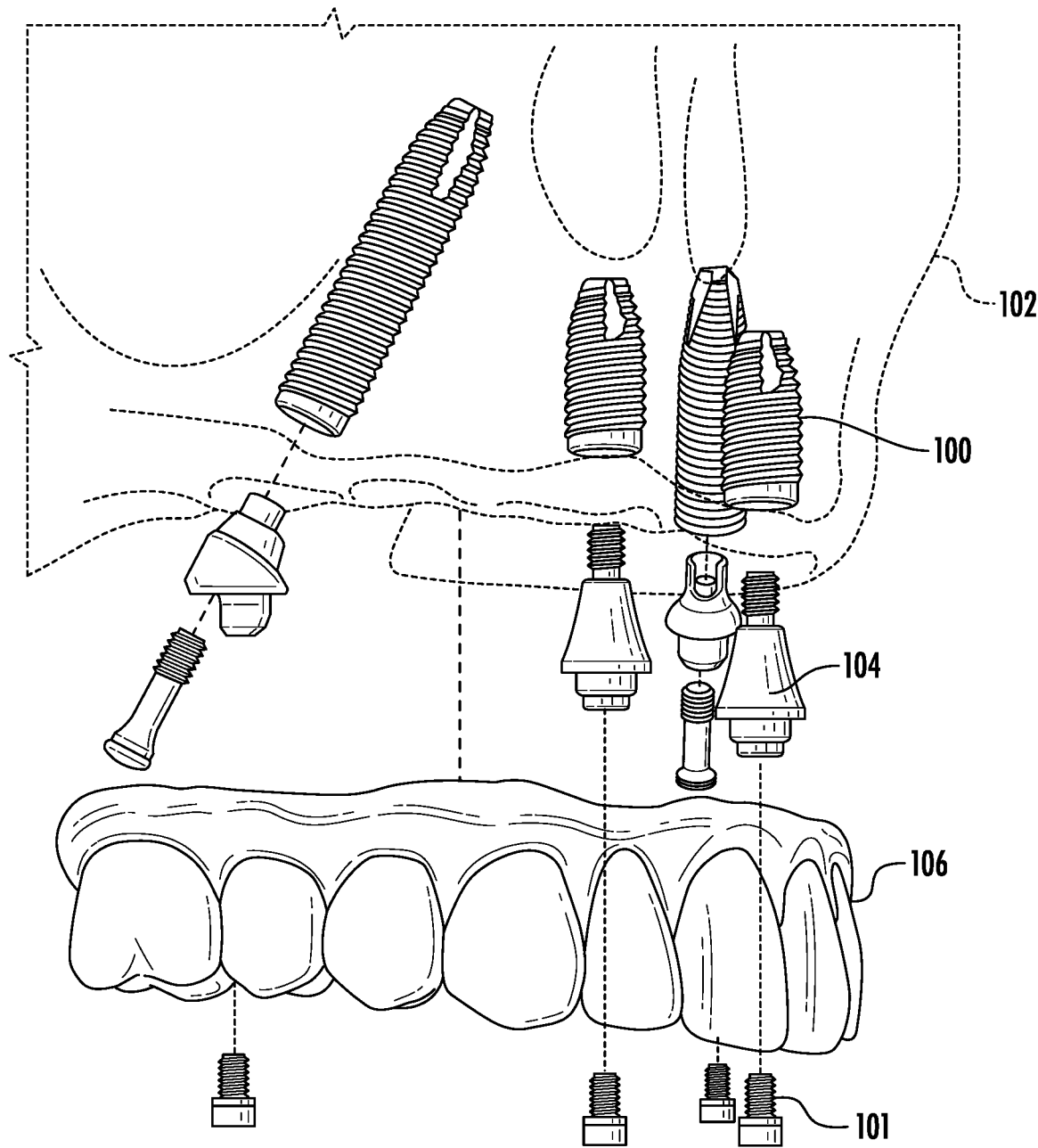
FIG. 1 is an exploded view showing the components used in known hybrid prostheses with dental implants.
Figure 2A:
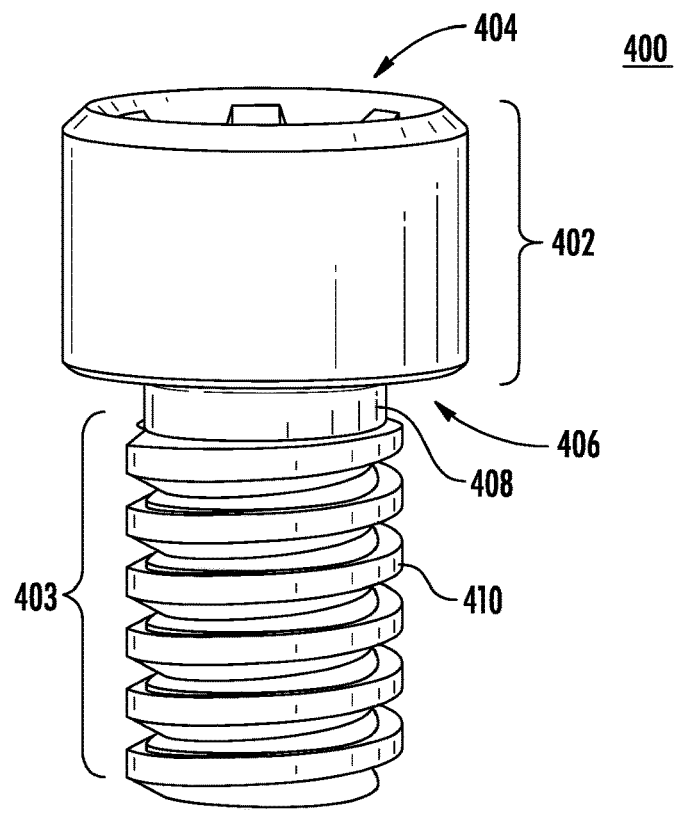
FIG. 2A is an elevation view of a conventional abutment screw for use in engaging the prosthesis to the abutments as shown in FIG. 1.

The abutment screw 40 has a drive 44 at the center of the upper surface 47 of the head 42, and a rounded underlying head surface 46, in contrast to the straight bottom surface of the conventional abutment screw 400 of FIG. 2A. Further, the shank 48 has a smooth surface over a greater portion of the length of the body 43 than is the case in the conventional screw. In addition, the threads 50 are provided and begin distally from surface 46, i.e. further down the body 43, as compared to the conventional abutment screw of FIG. 2A. The threads comprise a helical ridge extending around the threaded portion of the body, the helical ridge beginning at a point along the shaft which is distal the head.

Figure 2B:
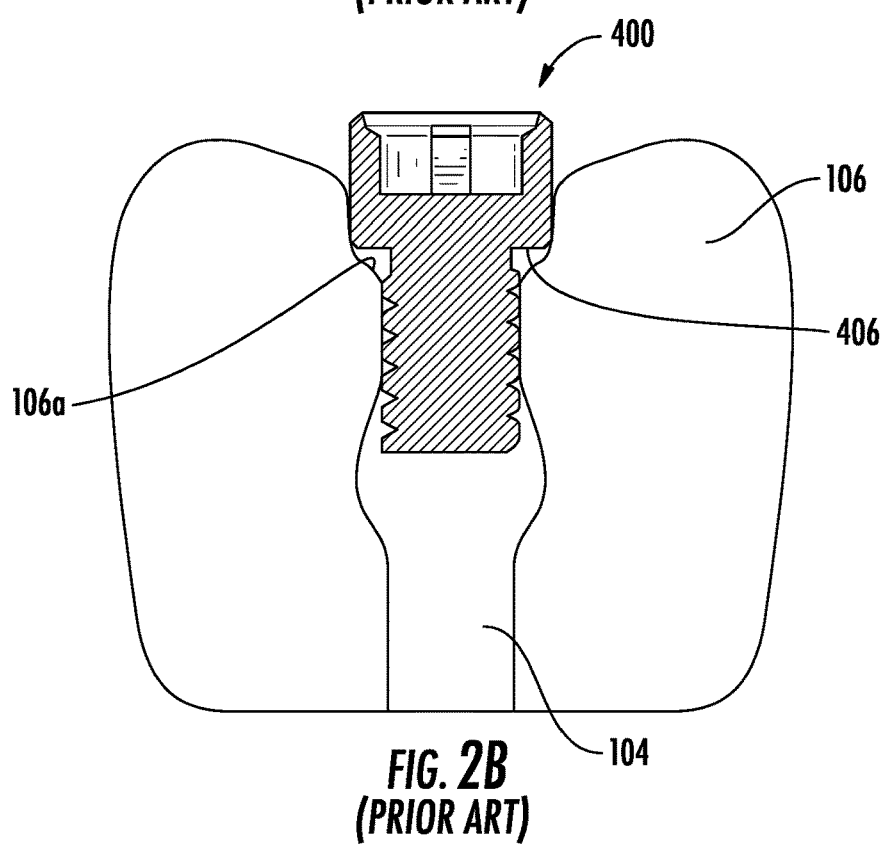
FIG. 2B is a sectional view showing the conventional abutment screw engaging a prosthesis.

As will also be discussed below with reference to other figures, the curved bottom surface 46 is configured so as to provide a smooth interface between the bottom of the screw head and the indentation in the prosthetic. In contrast to the conventional screw as shown and discussed above in relation to FIG. 2B, in using the screw according to the present invention, the engagement between the underlying curved head portion 46 and the corresponding indentation in the prosthesis provides a more continuous contacting of the metal of the screw head and the softer material of the prosthetic, making damage or weakening of the material of the prosthesis much less likely.

FIGS. 3B, 3D and 3E show the abutment screw 40' in accordance with the second embodiment. Generally speaking, the screws 40 and 40' of the first and second embodiments, respectively, are identical except for the cylindrical shaped contouring of the peripheral edge or wall of the screw head 42.

As will be recognized by those skilled in the art, the provision of this flattened contour makes the screw head have a smaller diameter when viewed from above, allowing it to be used in smaller diameter receiving contours of the prosthesis. But because in the second embodiment the underside 46 of the screw head still has the radius of curvature as in the first embodiment, it still has all the advantageous of the first embodiment, but with a thinner overall width profile.

As can best be seen in FIG. 3E, the screw of the second embodiment can be manufactured, for example, by shaving away the portion 45', for example using a lathe. It is noted that different shaped threads 50' are shown in some views of the second embodiment. However, generally speaking the threads can be the same for either embodiment. Numeral "40" will hereinafter be used to generally refer to the inventive abutment screw, i.e., for either the first or the second embodiment.

It is preferable that the abutment screw 40 be made of Titanium (Ti), but it could be made of surgical steel, for example, or any metal usable within a human patient. While the abutment screws will be described with regard to use in a multi-unit abutments in the context of using a hybrid denture, the screw of the present invention is also equally applicable with abutments used in conjunction with, for example, an individual tooth prosthesis, or a partial bridge prosthesis.

FIGS. 3A-3F show that the screw has a drive 44 that is for a particular type of hex drive, which is an excellent shape for driving an abutment screw. However, the invention is in no way limited to the use of the illustrated type of hex drive, and any other appropriate drive can be used in the screw.

In view of the need for the increased radius of curvature to dissipate the force, for example during a bite down by the patient, the screw head needs to be larger than traditional screw heads—i.e. so that there is more surface area between the underside of the screw head. Thus, the screw head is larger as compared to the screwdriver/tool engagement area.

Preferably the diameter of the threading area is less than that of the threads. The transition between the smooth shank and the threading preferably has a step inward in view of the diameter for threaded portion of shaft being less than that of the shank. The reason for this difference is that the threading makes up a weaker part of the screw, so it is preferable to have less pressure on the threading. Thus, the inward transition between the shank 48 and the threads 50 absorbs the bite down force at the step instead of that force being transferred, at least somewhat, to the threading.

Preferably the thread 50 will have a minimum of 4 turns and no more than 6. Also, the typical length of the shank 48 (smooth portion of the body 43) will be approximately 2 mm. The radius of curvature of the underside 46 will preferably be in the range of 0.79-0.85 mm. The height thickness of the head is preferably at least 1.5 mm.

The upper surface 47 of the head 42 is preferably also curved, most preferably with the same radius of curvature as the underlying surface 46. This has advantages, for example as to ease of manufacture. Also, the top being curved also has the advantage in that manipulating a drive tool will allow for a wider range of motion off of the horizontal plane.

Figure 4A:
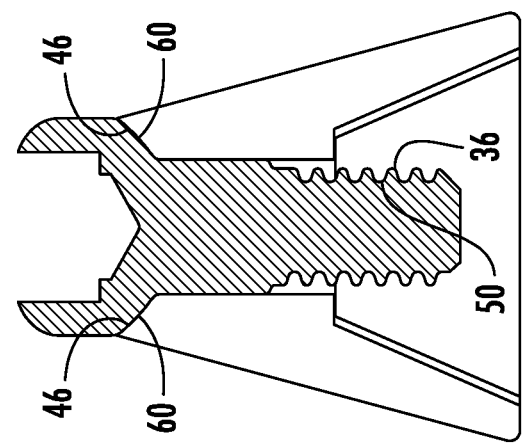
FIG. 4A is an exploded view showing how the screw of the present invention secures the dental prosthesis to an abutment.
Figure 4B:
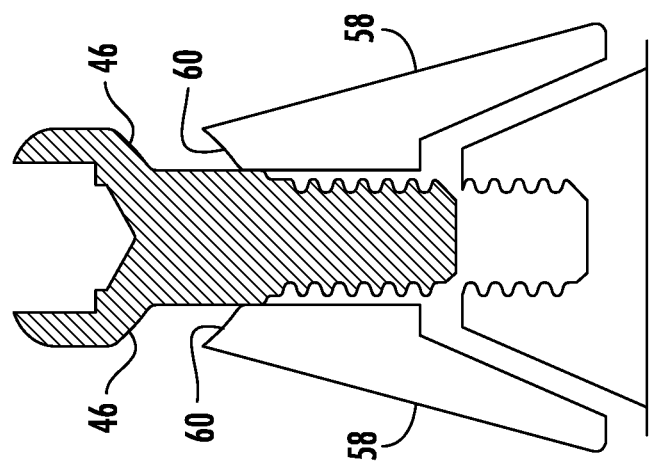
FIG. 4B shows a partially assembled state of FIG. 4A.
Figure 4C:
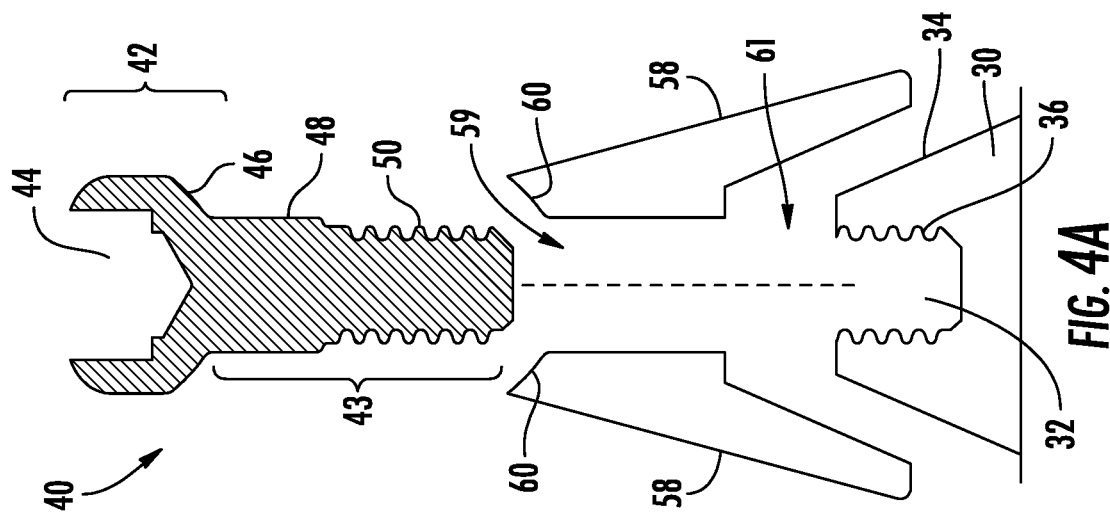
FIG. 4C shows a fully assembled state of FIG. 4A.

The three views of FIGS. 4A-4C include two exploded sectional views (FIGS. 4A and 4B) and culminate in an assembled sectional view (FIG. 4C) which, when taken together, illustrate the engagement of the inventive abutment screw 40, the prosthesis 58 and the abutment 30. FIG. 4A is a fully exploded view, showing the abutment screw 40 and the prosthesis 58 and the abutment 30 prior to any engagement. FIG. 4A is a partially exploded view, show a point in time at which the screw 40 has descended part of the way into the top of the prosthesis 58 and the bottom of the prosthesis partially overlaps the abutment 30.

FIG. 4A shows the abutment screw 40 with its head 42 and its body/shaft 43. The head 42 includes the underside curved profile 46 of the head 42 and the drive 44 of the head 42. The body 43 includes the shank 48 proximate the head 42, and the threads 50, distal the head 42.

As seen in FIG. 4A, the prosthesis 58, which is shown schematically in FIGS. 4A-4C, includes a mating surface 60, which, in three dimensions, is actually a single curved-profile annular mating surface. The mating surface 60 has a profile the curvature of which preferably corresponds to the curvature of the underside curved profile 46 of the screw head 42.

The receiving channel 59 of the prosthesis 58 has vertical walls and is for receiving the body 43 of the screw 40. Upon assembly, as shown best in FIG. 4C, the shank 48 of the body 43 of the screw 40 will rest snugly within the channel 59. Thus, the diameter of the receiving channel 59 should be about the same diameter as the shank 48. An outwardly tapering opening 61 of the prosthesis 58 is shaped so as to be able to snugly engage the tapered upper profile wall 34 of the abutment 30.

In FIGS. 4A-4C only a top portion of the abutment 30 is visible. The visible portion of the abutment 30 includes the tapered upper profile wall 34, which has a corresponding tilt so as to be able to mate snugly with the outwardly tapered opening 61 of the prosthesis 58.

The abutment 30 has a female threading channel 32, having threaded walls 36. The channel 32 is configured with its threading so as to be able to received and threadingly engage with the threads 50 of the screw 40. When fully engaged, as in FIG. 4C, the threading engagement results in a tight fit between the screw 40, the prosthesis 58 and the abutment 30. Since the unseen portion of the abutment is engageable with the dental implants securely implanted in the jaw of the patient, the assembled state of FIG. 4C provides a secure engagement of the prosthesis to the patient's mouth. As is understood, in some cases metal bars are used to secure the abutments to the patient, for example when there is not enough jaw bone and bone grafts are not appropriate.

Figure 5:
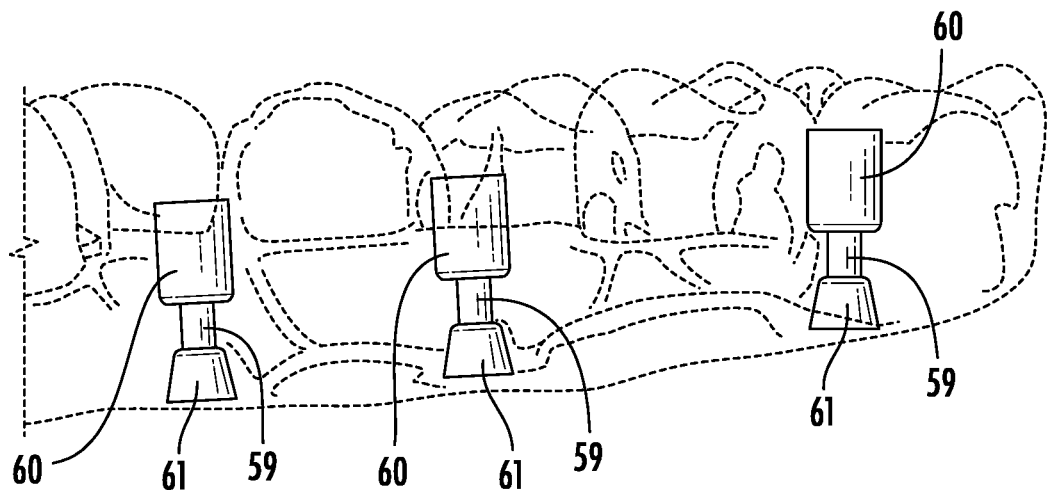
FIG. 5 is an x-ray view of a denture prosthesis showing the structure for receiving the screws and the abutments.

While the present invention is applicable to prostheses for individual teeth, and partial dentures, it also may be used to good advantage in the so-called hybrid denture prosthesis. FIG. 5 is an x-ray view of a hybrid denture prosthesis 58 that shows multiple instances of the receiving channel 59 of the prosthesis 58 having the vertical walls for receiving the body 43, and in particular the shank 48 of the body 43, of the screw 40. The outwardly tapering opening 61 of the prosthesis 58 is also visible at several locations, to be able to snugly engage the tapered upper profile wall 34 of the abutment 30, although abutments are not visible in this figure.

Figure 6:
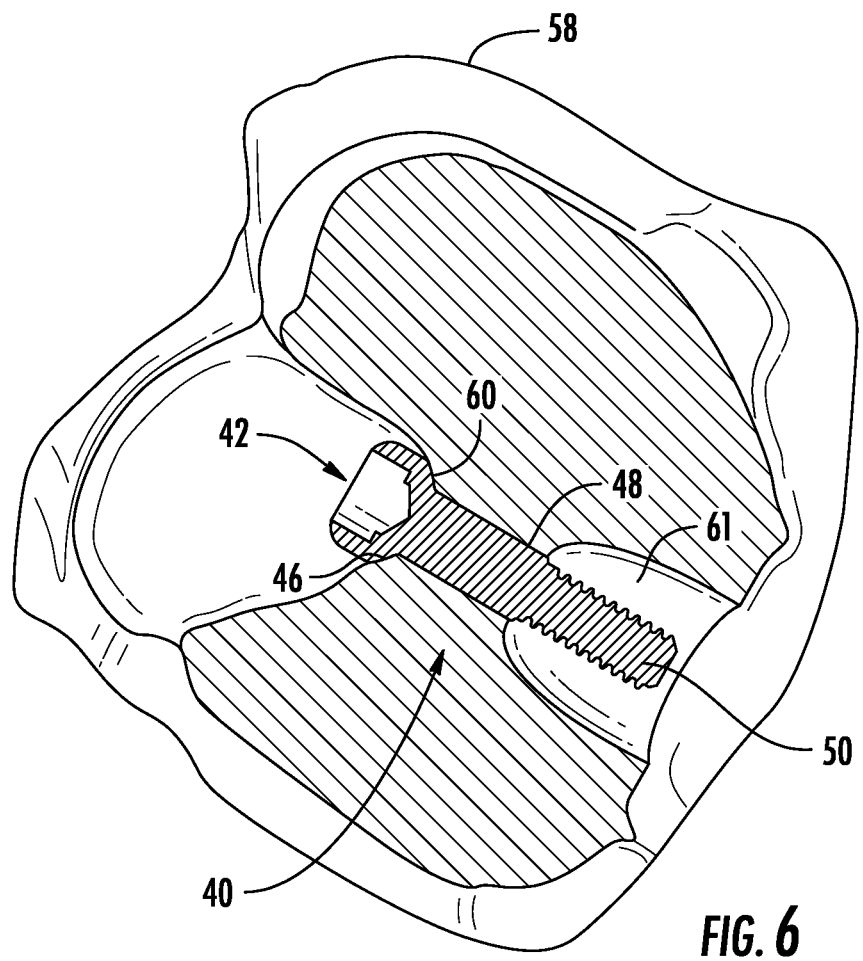
FIG. 6 is a sectional view showing how the abutment screw is engaged within a dental prosthesis.

FIG. 6 is sectional view of a tooth prosthesis 58 showing the screw 40 resting in the prosthesis. This view shows how the underside curved profile 46 of the screw 40 engages with the mating surface 60 that has the profile the curvature of which corresponds to the curvature of the underside curved profile 46 of the screw head 42.

Figure 7:
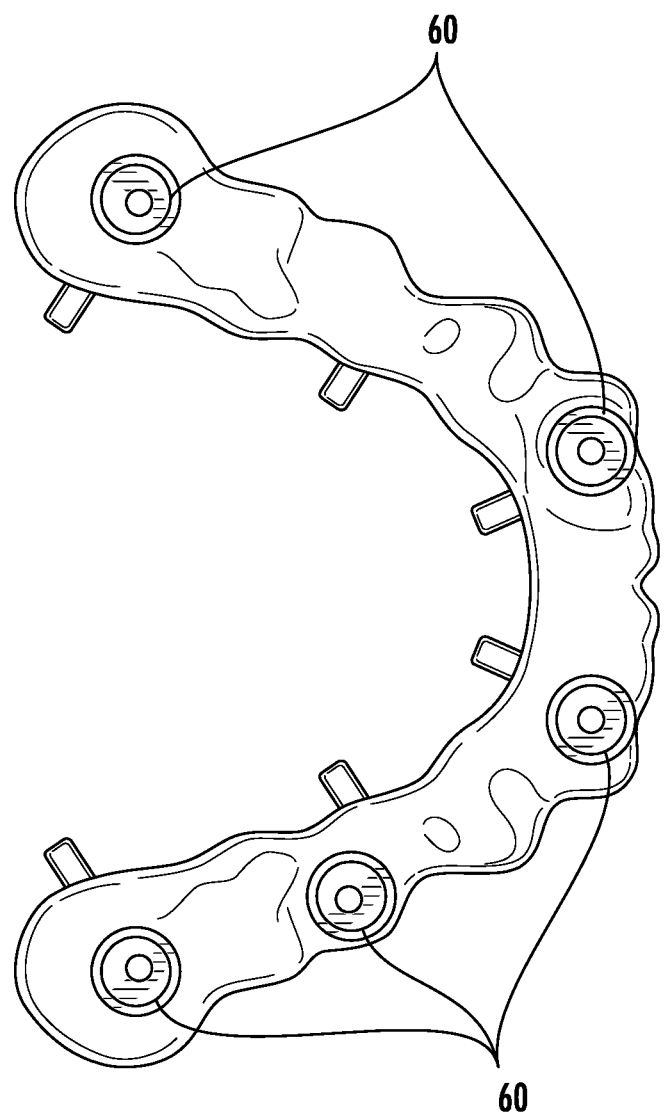
FIG. 7 is a plan view of a hybrid denture showing the screw receiving structure from above.

FIG. 7 shows mating surfaces 60 for screws in a plan view of a hybrid denture that could use the screw of the present invention. The hole into which the body of the screw is inserted is shown in the middle of the mating surface region.

It should be noted that in addition its use described above in securing a prosthesis to an abutment, the screw of the present invention is useful for engaging with any component made of a softer material such as ceramic, for example zirconia. For example, implants themselves are now being made of zirconia. Thus, the screw of the present invention can be used, for example as a healing abutment, to engage a zirconia implant without damaging the implant.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A tooth replacement assembly for affixing a dental prosthesis to a dental implant affixed to a jaw bone of a patient, the tooth replacement assembly comprising:
   (a) an abutment having a first end configured to securely engage with the dental implant and having a second end with a female threading surrounded by a tapered upper profile wall;
   (b) the dental prosthesis having, at a first end facing the abutment, an outwardly tapering opening shaped and dimensioned so as to be snugly engageable with the tapered upper profile wall of the abutment and, at a second end, a receiving surface, the outwardly tapering opening and receiving surface connected by a receiving channel having a channel diameter; and
   (c) an abutment screw comprising:
      a head; and
      a body,
      the body comprising:
         a shank having a smooth portion immediately proximate the head and having a first diameter that is about the same as the channel diameter, and
         a threaded portion axially aligned with, and distally spaced from, the smooth shank portion, the threaded portion beginning at a point along the shank which is most distal the head, the threaded portion having a second diameter, wherein the first diameter is greater than the second diameter; and
      the head comprising:
         an upper surface, having a drive at a central portion thereof and a curved surface, and
         an underside surface having a convex radiused curvature extending until it meets the shank, the convex radiused curvature being configured to conform to a corresponding concave curvature of the receiving portion of the prosthesis,
         and
      wherein the screw is configured to be tightened, by application of twisting force to the drive, so that the threaded portion of the body of the screw threadingly engages the female threading of the abutment, thus causing the convexed radiused curvature of the screw head to securely mate with the corresponding concave curvature of the receiving portion of the prosthesis.

2. The tooth replacement assembly of claim 1, the head further comprising, at a peripheral region thereof, a vertical cylindrical wall.

3. The tooth replacement assembly of claim 1, wherein the convex radiused curvature is in the range of 0.79-0.85 mm.

4. The tooth replacement assembly of claim 1, wherein a height thickness of the head is at least 1.5 mm.

5. The tooth replacement assembly of claim 1, wherein a helical ridge of the threaded portion comprises a minimum of 4 turns and no more than 6 turns.

6. The tooth replacement assembly of claim 1, wherein the dental prosthesis is made of zirconia and the abutment screw made of Titanium.

7. The tooth replacement assembly of claim 1, wherein the length of the shank is 2 mm.

8. The tooth replacement assembly of claim 1, wherein the drive is less than 50% of the area of the upper surface of the head.

9. The tooth replacement assembly of claim 1, wherein the drive is a hexalobular drive.

10. The tooth replacement assembly of claim 1, wherein the upper surface of the head is curved in an opposite direction with respect to the underside surface.

11. A tooth replacement assembly for affixing a hybrid dental prosthesis to a plurality of dental implants affixed to a jaw bone of a patient, comprising:
   (a) a plurality of abutments, each having a first end configured to securely engage with a respective dental implant and having a second end with a female threading surrounded by a tapered upper profile wall;
   (b) the hybrid dental prosthesis having, at a first end facing the plurality of abutments, outwardly tapering openings shaped and dimensioned so as to be snugly engageable with the tapered upper profile wall of a respective abutment and, at a second end, receiving surfaces, respective outwardly tapering openings and receiving surfaces connected by receiving channels having a channel diameter; and
   (c) a plurality of abutment screws comprising:
      a head; and
      a body,
      the body comprising:
         a shank having a smooth portion immediately proximate the head and having a first diameter that is about the same as the channel diameter, and
         a threaded portion axially aligned with, and distally spaced from, the smooth shank portion, the threaded portion beginning at a point along the shank which is most distal the head, the threaded portion having a second diameter, wherein the first diameter is greater than the second diameter; and
      the head comprising:
         an upper surface, having a drive at a central portion thereof and a curved surface, and
         an underside surface having a convex radiused curvature extending until it meets the shaft, the convex radiused curvature being configured to conform to a corresponding concave curvature of the receiving portion of the prosthesis,
         and
      wherein the plurality of abutment screws are configured to be tightened, by application of twisting force to the drive, so that the threaded portion of the body of the screws threadingly engages the female threading of the abutments, thus causing the convexed radiused curvature of the screw head to securely mate with the corresponding concave curvature of the receiving portion of the prosthesis.

\* \* \* \* \*